United States Patent [19]
Kajita

[11] 3,933,173
[45] Jan. 20, 1976

[54] CHECK VALVE
[76] Inventor: Yoshio Kajita, Tokyo, Japan
[22] Filed: Sept. 17, 1973
[21] Appl. No.: 398,168

Related U.S. Application Data
[63] Continuation of Ser. Nos. 148,156, May 28, 1971, abandoned, and Ser. No. 766,388, Oct. 10, 1968, abandoned.

[30] Foreign Application Priority Data
Feb. 26, 1968 Japan.............................. 43-11824

[52] U.S. Cl............................ 137/527.8; 137/515.7
[51] Int. Cl............................................. F16k 15/03
[58] Field of Search............. 137/515, 515.3, 515.5, 137/515.7, 527, 527.8; 251/148, 152, 298, 303

[56] References Cited
UNITED STATES PATENTS
2,532,067  11/1950  LaBour........................... 137/515.7
3,509,908  5/1970  Latham et al................ 137/527.4 X Primary Examiner—Robert G. Nilson
Attorney, Agent, or Firm—William Anthony Drucker

[57] ABSTRACT
A check valve, comprising in combination, a valve body defining a cylindrical passage for fluid flow therethrough from an upstream side to a downstream side of said valve body; a step on said upstream side for retaining a disc thereon; a hollow cylindrical support with top and bottom portions mounted on the downstream side of said valve body around said defined passage with a straight retaining groove towards the top portion of said hollow cylindrical support for retaining a shaft; a circular disc valve with a disc face sized to seal off said defined passage which will engage said step so as to close said passage; and, a shaft tangentially attached to the top thereof, said shaft being retained for free pivotal movement in said groove, whereby, liquid flowing downstream will push open said disc face which will pivot open on said shaft, but said disc valve will close when subjected to back flow pressure.

1 Claim, 19 Drawing Figures

Yoshio Kajita
INVENTOR

BY

ATTORNEY

CHECK VALVE

The present application is a continuation of my copending application, Ser. No. 148,156, filed May 28, 1971, now abandoned and my application, Ser. No. 766,388, filed Oct. 10, 1968 now abandoned.

BACKGROUND OF THE INVENTION

The present invention relates to a liquid check valve, and more particularly to a small compact check valve to prevent backflow.

When forcing liquid into a pipe line, it is necessary to check back flow. Thus when forcing liquid forward by means of a pump, a back flow cycle occurs. Therefore, to feed liquid during the forward forcing cycle, checking back flow is necessary at the loading point. If there is no forcing cycle, it is necessary to provide some checking means for the purpose of always keeping liquid in stability in the pipe line. Various kinds of check valves have been conventionally used. However, the prior art valves are complicated in construction, and to disassemble the valve is troublesome. When providing such check valves in pipe lines, one of the requirements is to cause no loss of flowing pressure, and for this purpose the caliber of the valve seat should be equivalent to, or more than the bore of the pipe line, and the diameter of the disc valve piece is inevitably larger than the bore of pipe line. The use of such a large disc or valve section in the valve body does not permit a ready fit in the hole portion of the corresponding pipe line on both sides of the valve body. It is necessary to mount the valve assembly in a direction crossing the pipe line and, the fitting used to open the disc valve has a diameter which is larger than that of the pipe line. Further this fitting for the disc valve piece requires a cover and a gasket. The disc valve piece inserted in this way, is rotatably installed by means of arms in the rotary seat in the pipe opening, and the cover for the opening is held by a plurality of bolts and nuts. Therefore the conventional arrangement requires a lot of components such valve bodies, covers, disc valves, valve seats, disc valve seats, arms, hinges, washers, plugs, gaskets, nuts and bolts, and moreover the valve bodies are fairly large, the inner constructions are complicated and the construction is not easy, and it takes considerable troubles and skill for factories to control many such parts and to make them. It is natural that the cost is high, and moreover such complicated systems have disadvantages so that check valves do not always work smoothly in the course of operations. Efforts have been made to cancel those defects. Thus, ball valve have been used for example, which are rotated in the valve body. To insert such a ball valve into the valve body, the valve body, is divided into two parts, which are held by a plurality of screws, and further a special structure is required which allows the ball valve to press smoothly to the valve seat in the valve body which is larger than the ball valve.

THE SUMMARY OF THE INVENTION

The present invention has overcome such defects. That is to say, the basic object of the present invention is to decrease lost force, and moreover to obtain a check valve of simple construction. For this purpose, the present invention proposes a new valve arrangement which substantially consists of only three members: a valve body, a disc valve and a valve support. The valve body has a passage in one side thereof, the diameter of which corresponds to the bore of the pipe line, and a valve seat is formed in this passage. The other side has an inside hole in which is mounted the valve supporter. This valve supporter allows the disc valve to rotate. The construction is extremely easy and manufactures of parts or controls becomes simpler. Further the length of the valve body is less than one-half the prior valve bodies, and its height or diameter is reduced. Thus, the quantities of material for manufacturing check valves is greatly decreased. Extra space for attachment is not required. Of course the cost is low and profits for users are greater. In addition, the disc valve is attached without any difficulty to the valve seat portion and fits the diameter of the pipe line of the valve body in spite of the fact that the diameter of the disc valve is larger than the valve seat portion. The pipe line does not have to have special pressure.

Thus, an object of the present invention is to provide a check valve of easy manufacture and fabrication. It is essential for conventional kinds of check valves to be of bent-construction. The valve body has a passage running to the pipe line which crosses an opening for fitting the disc valve. The check valve according to the present invention consists of the above mentioned three members, and the construction uses a perpendicular cutting and grinding processes, and complicated bendings are not needed. Therefore each member is easily made by simple processes of cutting or grinding, and further the assembly is made merely mounting or fitting the three members thus obtained.

Another object of the present invention is to prevent the movable portions from gathering rust. The disc valve of the check valve must work smoothly and so rust on the movable portions, i.e., rotary shaft portions is a vital defect. In the present invention the valve body is inside, with a valve supporter by which the valve is rotated. Consequently this valve supporter uses non-rusting steel which does not become sticky, thereby preventing the rotary shaft from gathering rust. Since the valve supporter itself is only installed in the valves body, it is comparatively small and the larger valve body is made with usual material and so if only this valve supporter is made of non-rusting material of higher cost it is of little importance. Therefore prevention of rusting on the movable portion is easily attained.

Still another object of the present invention is to provide a check valve which can be made by mass production. It is self-evident that the check valve of the present invention is suitable for mass production because this consists of three members, and production as well as assembly are easy. The check valve of the present invention is, even when housing is utilized, readily manufactured with one piece or a two pieces of substantially similar type. Accordingly, this invention is appropriate for mass production.

Yet another object of the present invention is to provide a check valve which can be suitably mounted. The check valve of the present invention is narrow in width. Besides the valve body simply contacts the ends of the valve support. Therefore the present invention is and can be used as a substitute for the housing mechanism. The necessary parts are only the valve supporter and the disc valve, resulting in a more simple construction and easy to manufacture. The pipe line itself can be utilized as part of the mechanism, i.e., the end flange portion of the pipe line is made to be thick, and a round step is provided in this end flange.

Another object of the present invention is to decrease shock or noise when checking back flow, and to provide a check valve which operates so as to check back without mechanical bending or distortion. In some check valves, the disc valve strikes against the valve seat so loudly that the noise spreads all over the whole pipe line. Such a large impact causes bending of the disc valve and the valve seat, and repetitions bring about cracks or damage in the mechanism. Even if packing materials or other buffer materials are used, it is difficult to avoid such defects, and these members wear fast. In the present invention, components fit as one body together with the valve seat and are arranged so as to rotate and mold the valve seat components by springs or other resilient material, and in this manner the impact on the disc valve working area is absorbed so that noise distortion or damage is avoided. Therefore, smooth operation of checking back flow can take place for long periods of time.

Other features and concrete embodiments of this invention can be clearly understood with reference to the accompanying drawings in which:

BRIEF EXPLANATION OF THE DRAWINGS

FIGS. 2 (A) and (B) are side and front views of the valve support;

FIGS. 3 (A) and (B) are perspective and front views of the disc valve;

DETAILED DESCRIPTION

Figure 1:
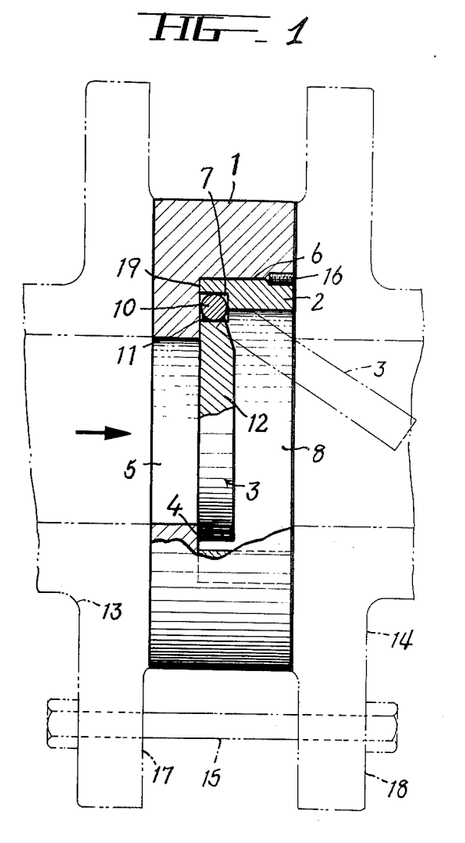
FIG. 1 is a fragmentary side view, partially in section, illustrating a basic embodiment of the present invention, showing the attaching relationship to a pipe line.
Figure 2:
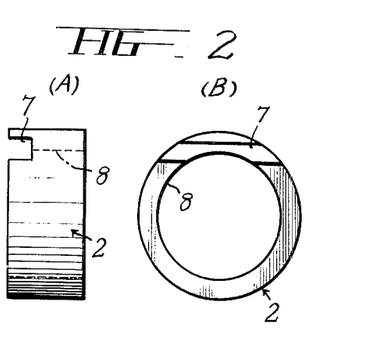
Figure 3:
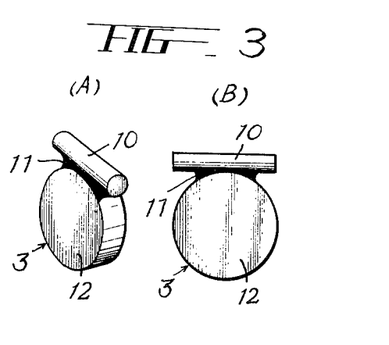

FIG. 1 or FIGS. 3 A and 3 B shows one basic embodiment of the present invention which consists of a circular valve body 1, a circular valve support 2 and a disc valve 3. The valve body 1 defines a passage 5 corresponding to the inside hole of pipe line members 13, 14 and has a mounting concave portion 6 concentric with passage 5. It also has a circular valve seat portion 4 in a step between the passage 5 and a concave retaining portion 6. A linear shaft receiving portion 7 is laterally provided in one side, at the upper portion of valve supporters 2 along a passage. As shown in FIG. 3, the valve body 3 is attached to a rotating shaft 10, on one side of a disc shaped body 12 by a weld 11. The fabrication thereof is accomplished by fitting, at first, the rotating shaft 10 of the valve body 3 into the shaft fitting portion 7 of the valve supporter 2, then inserting the thus assembled members as one piece into a retaining portion 6 which services as a flow way of the valve body 1, and fixing them by means of fixing members e.g. bolts 15 between flanges 17, 18 of the pipe line members 13, 14 in such a manner as to contact the disc valve 3 to the valve seat portion 4. The relative position of the valve body 1 and the valve supporter 2 is fixed by proper insertions of a stopper 16 e.g., a small pin in the boundry between components.

To explain the functions of the embodiments shown in FIG. 1 to FIGS. 3 A and 3 B in case the valve body is installed as shown in FIG. 1, when fluid starts to flow in the directions of the arrow, the disc valve 3 rotates around the rotary shaft 10 to permit liquid to flow freely, and if this fluid begins to flow backwards, the pressure of the backward flow and the weight of the disc valve 3 itself press the disc valve 3 to the valve seat portion 4 as shown in FIG. 1, thereby checking the backward flow. The structure thereof is fairly simple, and consists only of three members. Since the fitting portion 6 which acts as a flow way is fitted with the valve supporter 2 which rotatably supports the disc valve 3, it is not necessary to form a special fitting for the disc valve 3, and therefore the check valve is compactly made and is also very narrow in width, and further fits the disc valve 3 to the valve seat portion 4. Such a thin check valve can be applied everywhere in the tube-line, without taking extra space. The disc valve 3 is supported by means of the rotary shaft between the valve supporter 2 and the inner step 19 of the valve body 1, so that a profrusion does not occur in the place relative to the valve seat 4. If the valve supporter 2 is made of non-rusting steel, rust is prevented from gathering on a portion of the rotating shaft 10, and the valve performs the function of check back flow for a long period and follows exactly the variable pressures of the liquid. Such a simple check valve of the present invention can be manufactured through the processes of perpendicular cutting and grinding or other simple processes, and it is obvious that the fabrication is easy, requiring neither special processes and material of low cost may be used.

Figure 4:
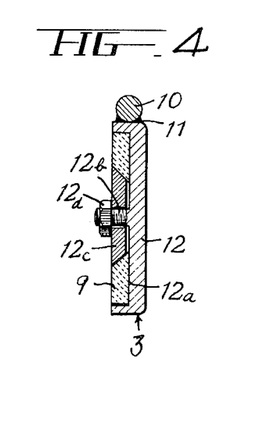
FIG. 4 is a cross-sectional view showing another disc valve of the present invention.

FIG. 4 shows other embodiment of the disc valve according to the present invention; a concave part 12a is formed in the side of the disc valve 3 which connects the valve seat, and the inner packing material 9 of Teflon or other synthetic resins are fitted. The assembly is held by a holding washer 12c and a nut 12d so as to act as one body, firmly screwed on a fixing rod 12b in the center of the valve 12. Thus, the packing materials 9 effect a close seal to the seat.

Figure 5:
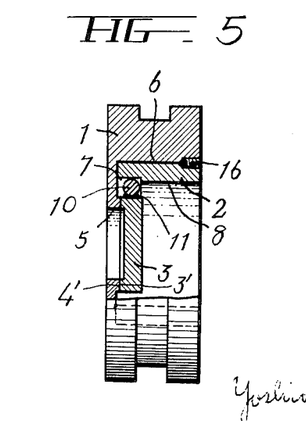
FIG. 5 is a fragmentary side view, partially in section, showing another embodiment of the present invention.

FIG. 5 shows another varied example according to the present invention wherein a valve seat 4' is formed in the valve body 1, projecting a little, while a sealing portion 3' is also formed, projecting in a circular shape on the circumference of disc valve 3 to engage valve seat 4'. These members perform a sealing function.

Figure 6:
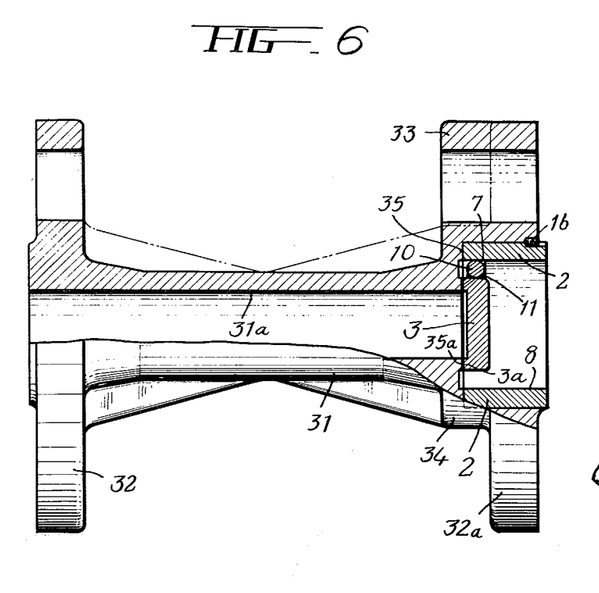
FIG. 6 is a further embodiment according to the present invention.
Figure 7:
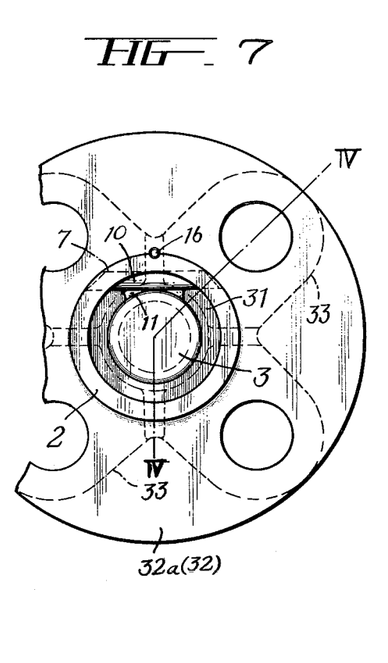
FIG. 7 is a front partial view of FIG. 6.

FIG. 6 to FIG. 13 show embodiments wherein the present invention is used with various mechanism or units. In FIG. 6 and FIG. 7 the pipe line unit is used as a valve body. The pipe line unit 31 to be the valve body has flanged rims 32, 32a for connections on both ends thereof, one rim 32a of which defines therein a comparatively thick connecting seat 33. A circumferencial part of the pipe provides a hub 34 of the same thickness and in this part a concave step 35 is formed so as to be substituted for the valve body 1 of the present invention. The valve supporter 2, the disc valve 3 and the attaching structure which are fitted in the concave step 3 are the same as those shown in FIG. 1 to FIG. 3, and the difference between the two embodiments is that the circumference of the disc valve 3 is provided with an engaging part 3a which protrudes in a circular shape. This part engages member 35a which also protrudes a little on the outside of a pipe hole 31a of concave step 35; and these components check the back flow, but the composition and function or effect are substantially the same as in FIG. 1 to FIG. 3.

Figure 8:
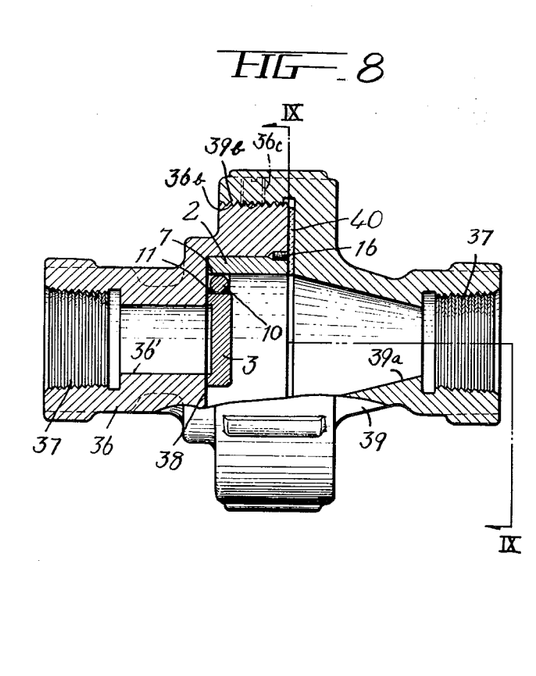
FIG. 8 is a fragmentary side view, partially in section of a modified embodiment according to the present invention so as to be utilized in a threaded pipe line.
Figure 9:
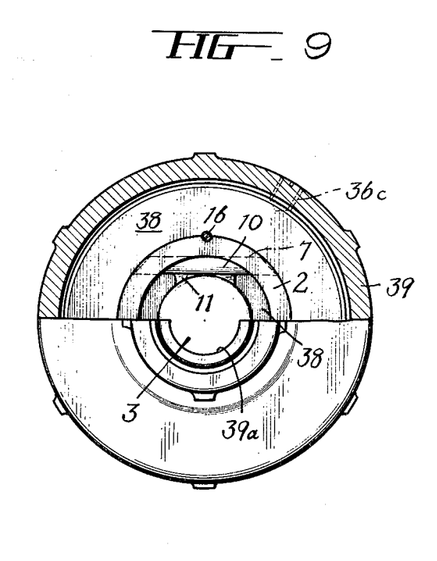
FIG. 9 is a front view of FIG. 8.

FIGS. 8 and 9 show that the pipe line is formed of two units, and the check valve of the present invention is provided in between. The pipe line 36 has a passage 36' with threaded connecting portion 37 in one end thereof; in the other end of the pipe line 36 there is an engaging step portion 38 of a round shape, concentric with passage 36'. The valve supporter 2, the bore of which is larger than the diameter of passage 36', is mounted in this engaging step portion 36. This valve supporter 2 is rotatably supported with the disc valve 3, just as the other embodiments. The other end portion of the pipe line acts as a contacting surface to a packing so that said pipe line 36 connects with a second pipe line 39 having a screw thread in the end of the pipe. Further threads 36b are placed on the circumference of said pipe 36 thereby engaging a corresponding part 39b of the second pipe line 39 so that both pipe lines 36, 39 are held together with packing 40 and by means of a stopper 36c.

Figure 10:
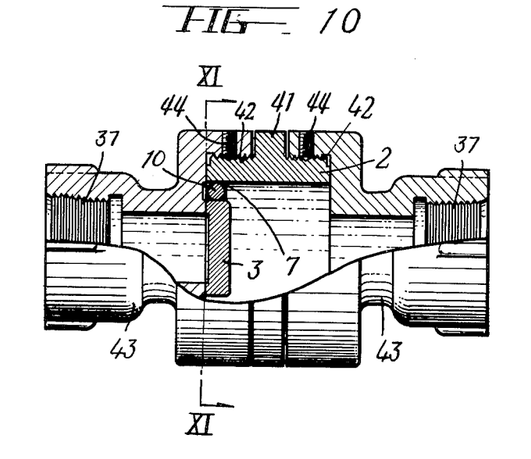
FIG. 10 is a fragmentary side view, partially in section, of another threaded embodiment.
Figure 11:
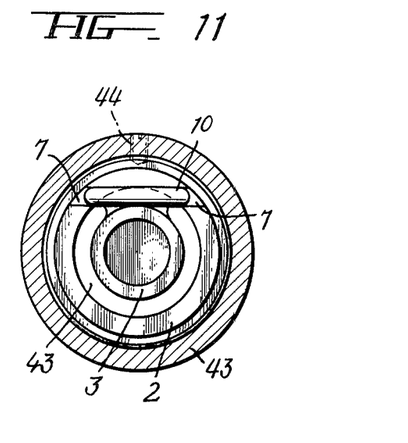
FIG. 11 is a cross-sectional view along the line XI—XI of the FIG. 10.

FIG. 10 and FIG. 11 show another embodiments with a flanged rim 41 around the circumference of the valve supporter 2 and the both sides of the rims 41, respectively, have screw 42. The attaching of the disc valve 3 to the valve supporter 2 is the same as for the other embodiments, the pipe line sections 43, 43 acting as the valve bodies are of the same type. Screw threads are opposite each other on the both sides of the flanged rim 41, and said sections engage with the screw threads 42 and are held by stopper 44. The pipe line sections 43 43 are illustrated as comparatively short in length, however any length may be used and both of these lengths are not necessarily equal.

Figure 12:
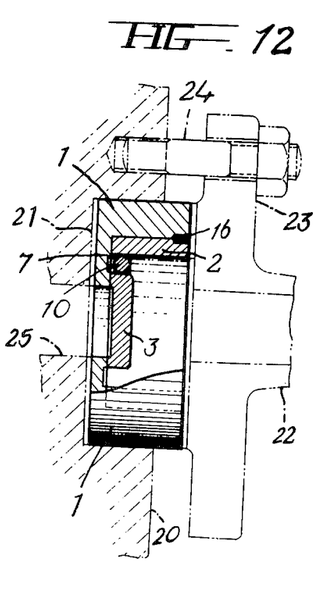
FIG. 12 is a fragmentary side view, partially in section, of a modified arrangement of the present invention which can be attached directly to a mechanism.

FIG. 12 shows the case where the check valve of the present invention is provided in the housing of a mechanism. The check valve having the construction shown in FIG. 1 to FIG. 3 or FIG. 5 is installed into a concave section 21 in housing 20 and is held by means of a locking means 24 so that a flanged rim 23 of pipe section 22 is attached to housing 20. In this case, the connecting pin 16 is not required in the boundary between the valve body 1 and the valve support 2, or use of the valve body 1 may be omitted on the condition that there are stop means for holding pin 16, and a comparatively small concave part 21 to fit the valve support 2 is sufficient when formed concentrically with a passage 25. In this way, the check valve function can be carried out.

Figure 13:
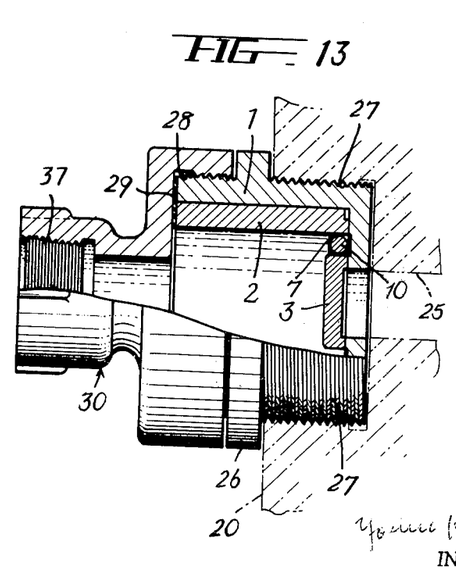
FIG. 13 is an arrangement to be attached to a machine similar to the arrangement shown in FIG. 12, and is a fragmentary side view, partially in section.

FIG. 13 shows an embodiment wherein flanged rim 26 is formed in the middle of the valve body 1 so as to be attached to housing 20. There are screws threads 27 28 on the both sides of the flanged rim 26, and they connect with housing 20 and at the same time engage a pipe connecting material 30 through a packing 29. The construction inside of such valve body 1 is the same as above stated. When the check valve has a flanged rim and screw threads on the valve body 2 as in FIG. 10, the concave part to be formed in the housing may be obviously made smaller.

Figure 14:
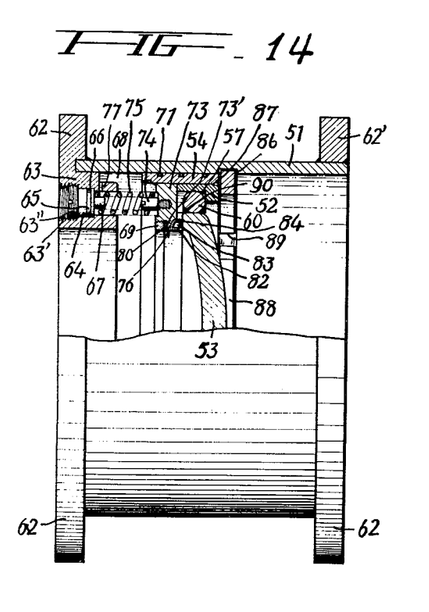
FIG. 14 is a fragmentary side view, partially in section, of another embodiment of the present invention.
Figure 15:
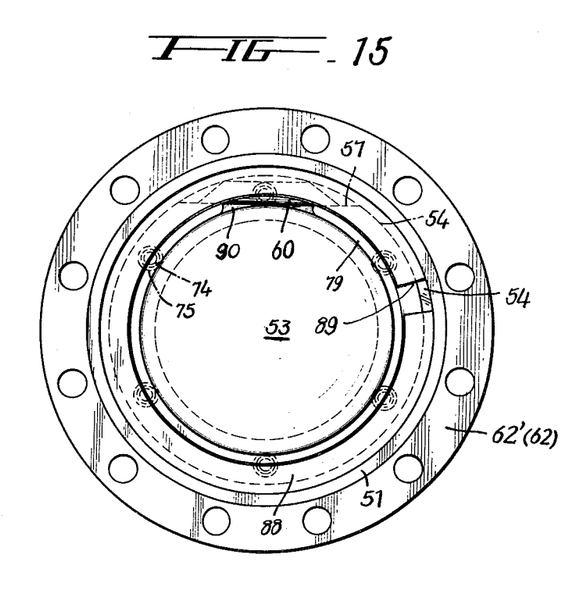
FIG. 15 is a front view of FIG. 14.

FIG. 14 to FIG. 17 shows embodiments which are altered in order to have a check valve which can sustain special impacts. FIG. 14 and FIG. 15 show an embodiment designed so as to be installed in a conventional pipe line; flanged rim pieces 62 62' are provided on the both end portions of the valve body 51 which is connected to the pipe line by these flanged rim pieces 62 62'. As shown in FIG. 14, one flanged rim piece 62 connects to a seat 63 in the inside of the pipe line, to which seat a controlled support 74 is attached. The controlled support 74 is fixed so as to be controlled freely by turning a screw 63" engaging the controlled support 74, and a packing attaching member 65 is formed in the middle of the controlled support 74, with a ring-shaped packing 66 attached to this attaching member 65, and further a spring receiving portion 67 protrudes in the point thereof. A clearance is formed between the valve body 51 and the outside circumference of the inside end portion of said seat 63. There is a cut and ground groove 68 to admit one end side of a sliding member 54 which is in a small hole 77 and goes through from groove 68 to spring receiving portion 67. Seat 63 provided inside cylindrical sliding member 54 which holds a ring-shaped packing 71 to the outer circumference of the valve body 51. An attaching seat 73 is provided in the inside of said sliding member 54 and is attached to another support 74 opposite to controlling support 64. Between these support 74 74 is a spring 75 and the attaching seat 73 is provided inside with a ring-shaped valve seat element 76 having a suitable elasticity. This valve seat element 76 is attached at an attaching portion 80 on one side by means of a dog 73' of the attaching seat 73 and a ring-shaped screw 69 passing from another side of attaching seat 73. A cushioning valve seat portion 82 on the other side has an inner hole 83, thereby providing a suitable cushion by contacting the circumference of movable valve 53. For this purpose, if necessary and opening 84 is formed on the outside of inner hole 83, this opening 84 is first closed when pressed by the valve 53, and liquid is shut in the inner hole 83 in such a condition that cushioning is performed. A shaft supporting part 57 is provided having a concave shape on the top of the valve support 52 on which is fitted sliding member 54 by driving a stopper 85 into the surface thereof, and which is opposite to seat 73. This shaft supporting part 57 accepts a rotary shaft 60 of movable valve 53. The shaft supporting part 57 is arranged straight (FIG. 15) and has a rod-shaped rotary shaft 60 in both ends thereof, and unites valve supporter 52, the movable valve 53 and sliding member 54 so as to have a mounting groove 86 in the inside of the valve body 51, into which a holder ring 88 is fitted. The holder ring 88 is made of suitable elastic material, and able to contract or shrink in diameter because of an opening 89 in one spot. It fits onto the mounting groove 86 and expands to exactly mount onto the mounting groove 86 in order to prevent the sliding member 54 from coming out.

The movable valve 53 is held with a rotary shaft 60 by valve supporter 52 which is on sliding member 54, and rotates between the valve supporter 52 and the attaching seat 73 to perform opening and closing operation just as in conventional check valves. However, with back flow because of movable valve 53 contact; the cushioned valve seat portion 82; the cushioned seat portion 82 is received by the spring 75 through sliding work of the sliding member 54, that is, the valve seat portion 82 is made to slide by spring 75 in the direction of the valve body 51, and the sliding movement of valve seat portion 52 and the cushioning operation of the valve seat portion 82 co-operates to receive movable valve 53 so that the impact is less, and noise at back flowing is avoided. This prevents structural distortion and the valve can work smoothly checking back flow for long periods. A small hole 77 and the groove portion 68 is provided so that when the sliding member 54 is forced backwards and the end portion thereof enters the groove portion 68, liquid in said groove portion 68 is sealed off and then spouts out of hole 77 thereby performing a final cushioning function. That is, by sliding member 54 and the attaching section 73 liquid along the inside of the valve body 51 is led bit by bit to the central part of the pipe line to provide an impact buffer.

Figure 16:
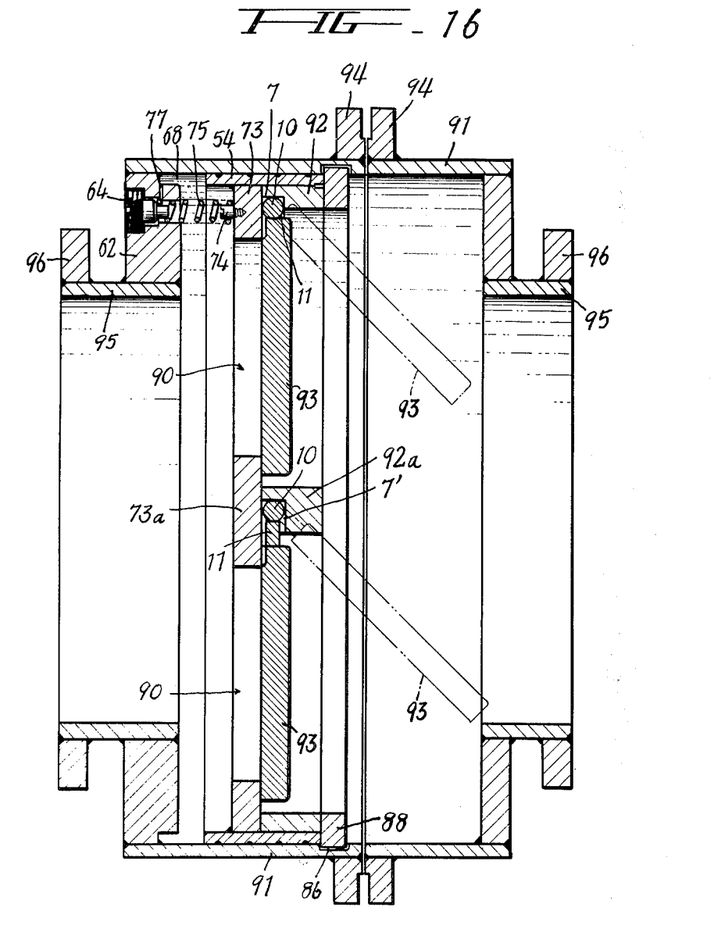
FIG. 16 is vertical sectional side view of a further embodiment of the type shown in FIG. 14 to be used with pipe lines with large diameters.
Figure 17:
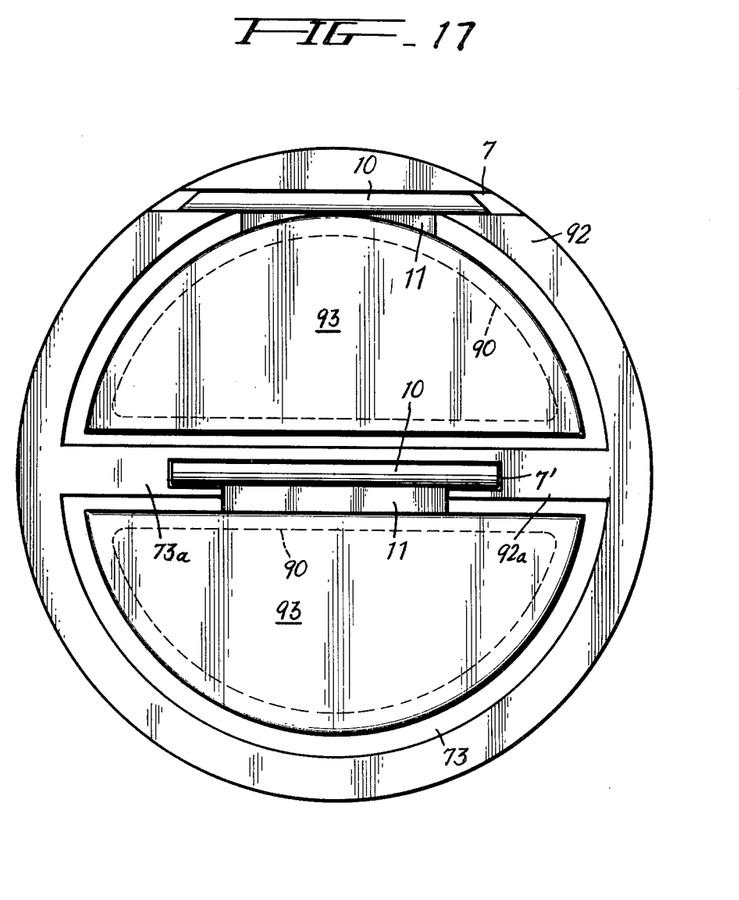
FIG. 17 is a front view of the FIG. 16.

FIG. 16 and FIG. 17 show an arrangement which performs the same impact and buffer operation as shown in FIG. 14 and FIG. 15, and show an embodiment which is suitable for use in a pipe line of comparatively large diameter, i.e. this construction is made by crossing a second supporting portion 73a over a central part of the pipe line in the middle part of the attaching section 73 of the arrangement shown in FIG. 14 and FIG. 15. Accordingly two semicircular passage 90—90 are disposed symmetrically opposited in the upper and lower part of this supporting portion 73a; two valves 93—93 are arranged in these passage 90—90. These valves 93—93 are as shown in FIG. 17, and rotary shafts 10 are supported in the receiving grooves 7 and 7' of the valve supporter 92. In order to form this receiving groove 7' a supporting portion 92a is formed laterally in the middle of the valve supporter 92 and each of the valves 93—93 is connected with rotary shaft 10 by a welded portion or connecting portion 11.

Since this embodiment is formed by crossing the supporting portion 73a in the middle of the valve supporter as above-mentioned, the pipe materials 95 95 corresponding to the diameter of the conventional pipe line are provided to the attaching portion 73 furnished inside of said valve body 91 so as to provide a valve body 91 with a larger diameter than in a conventional pipe line. The valve body 91 is divided into two sections so that the inner parts can easily be put together and they are connected with flanged rim portion 94 94. Flanged rim portions 96 96 are also provided on the outer end portions of the pipe 95 95 which are connected in the pipe lines as shown in FIG. 14 and FIG. 15. Supporter 64 on the attaching seat 63 is different from those of FIG. 14 and FIG. 15, the controlling and opening portion of this embodiment also are outside when used on and elasticity of the spring 75 is to be controlled in the connected condition.

According to the arrangements shown in FIG. 14 and FIG. 17, the contemplated valve arrangement is quite different from prior art devices. That is to say, while conventional valve seats are firmly fixed and disc valves are connected to such fixed valve seats in order to stop fluid flow, the valve seat of the present invention is slideable and as springs or other elastic materials receive such valve seat or sliding members assembled in one body with this valve seat, those elastic materials absorb impact on contacting and closing of the movable valve. This results in no noise as well as no distortion in the components or unsmooth work by operation of the movable valve.

Figure 18:
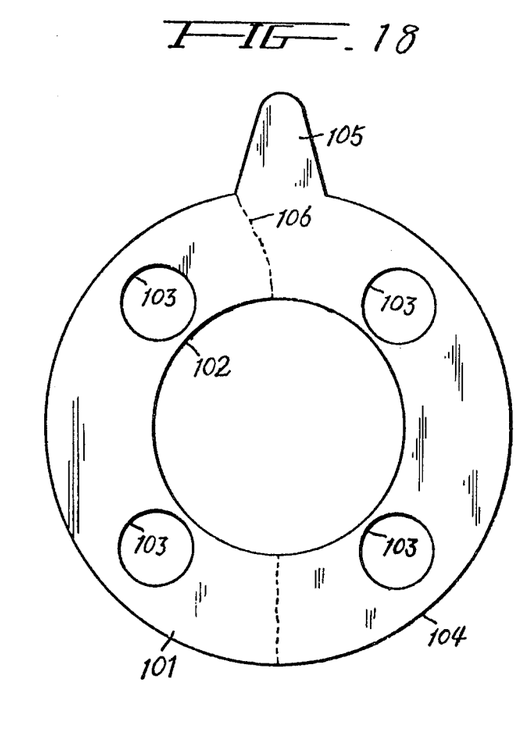
FIG. 18 is front view of the means to attach the check valve system of the present invention into the pipe line; and, FIG. 19 is a sectional side view of FIG. 18.
Figure 19:
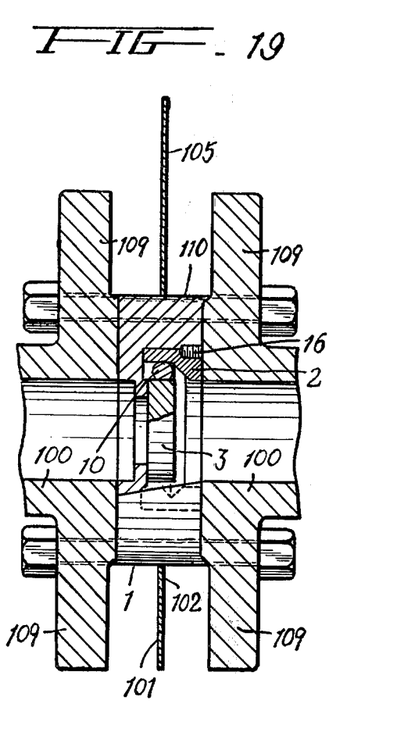

FIGS. 18 and 19 show the preferred way for fitting the disc valve into the pipe line. Since the arrangement of the present invention is small with little thickness ans has no substantial flange for connection, the installation is different between pipe bodies having the usual rims, flanges for connection.

As shown in FIG. 18 circular flat piece 101 such as paste board is provided with a round hole 102 in the center for fitting the valve body 1.

Also there are holes 103—103— for inserting the threaded components of the flanges 109—109 in the pipe pieces 100 100 to be connected, a handle portion 105 is formed on a part of the circumference 104, preferably in the upper part; if necessary, mounting hole 102 is surrounded with cutting guide line 106—106 such as perforated lines.

FIG. 19 shows one example of using this arrangement. The valve body 1 is mounted in said mounting hole 102 and placed between the flanges 109—109 of the pipe bodies 108—108. As the handle portion 105 projects out, insertion into the narrow space between the flanges 109—109 is performed without difficulty; and when the valve body is placed by using the circumferential outline 104 and the circumference of the flange 109 the flat piece 101 being circular, even if the former does not fit exactly, appropriate alignment can be obtained. After placing the valve body 1 between the flanges 109—109 in this way, a bolt 101 is inserted through the flanges 109—109 and hole 103 so as to connect to the pipe pieces 100—100. Afterwards if necessary, the flat pieces 101 can be removed.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a check valve comprising a valve body having a stepped bore providing an inlet bore, an outlet bore of greater diameter than said inlet bore and a wall extending laterally of and between said inlet and outlet bores, providing a valve seat, a circular valve support having its periphery detachably mating with said outlet bore and an end face positioned against said valve body wall, said valve support having a bore of a greater diameter than said inlet bore, a disc valve being of a smaller diameter than and positioned in said valve support bore and being of greater diameter than said inlet bore, the improvement in which said valve support end face has a straight slot thereacross facing said valve body wall, the axis of said slot being tangential to the bore in said support, and a shaft attached tangentially at the surface of said shaft to a portion of the periphery of said disc valve and being seated in said valve support slot pivotally supporting said disc valve for flap movement to and from said wall for closing and opening said inlet bore.

* * * * *